US010594175B2

(12) United States Patent
Patel et al.

(10) Patent No.: US 10,594,175 B2
(45) Date of Patent: Mar. 17, 2020

(54) ELECTRICAL MACHINE LAMINATIONS

(71) Applicant: Hamilton Sundstrand Corporation, Charlotte, NC (US)

(72) Inventors: Dhaval Patel, Loves Park, IL (US); Andreas C. Koenig, Rockford, IL (US); Andrew R. Wilkinson, Cherry Valley, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 122 days.

(21) Appl. No.: 15/445,411

(22) Filed: Feb. 28, 2017

(65) Prior Publication Data

US 2018/0248421 A1  Aug. 30, 2018

(51) Int. Cl.
H02K 1/18 (2006.01)
H02K 1/16 (2006.01)
H02K 15/02 (2006.01)

(52) U.S. Cl.
CPC ............. *H02K 1/185* (2013.01); *H02K 1/165* (2013.01); *H02K 15/024* (2013.01)

(58) Field of Classification Search
CPC ........... H02K 1/185; H02K 1/16; H02K 1/165
USPC .... 310/216.008, 216.004, 216.129, 216.131, 310/216.133, 427, 432, 216.132
See application file for complete search history.

(56) References Cited

U.S. PATENT DOCUMENTS

| 880,429 A * | 2/1908 | Treat | |
| 1,353,658 A * | 9/1920 | Kostko | H02K 1/185 24/69 SK |
| 2,610,225 A * | 9/1952 | Korski | H02K 1/16 29/609 |
| 2,620,225 A * | 12/1952 | Hutchinson | B60P 1/20 298/19 B |
| 3,513,527 A * | 5/1970 | Hoy | H02K 15/024 156/222 |
| 3,519,862 A * | 7/1970 | Walker | H02K 3/48 310/214 |
| 3,976,901 A * | 8/1976 | Liptak | H02K 3/48 310/214 |

(Continued)

FOREIGN PATENT DOCUMENTS

AU 2229877 * 8/1978
FR 2341977 A1 9/1977

(Continued)

OTHER PUBLICATIONS

Extended European Search Report, of the European Patent Office, dated May 2, 2018, issued in corresponding European Patent Application No. 18158996.1.

*Primary Examiner* — Jermele M Hollington
*Assistant Examiner* — Ahmed Elnakib
(74) *Attorney, Agent, or Firm* — Locke Lord LLP; Daniel J. Fiorello; Scott D. Wofsy

(57) ABSTRACT

A lamination for an electrical machine lamination stack includes a body defining a plurality of winding slots on an inner diameter thereof and at least one inner diameter cleat aperture defined by the body configured to receive a cleat in an unlocked position and to interfere with the cleat when the cleat is transitioned to a locked position within the inner diameter cleat aperture such that a plurality of laminations can be stacked and locked together by the cleat.

17 Claims, 3 Drawing Sheets

(56) References Cited

U.S. PATENT DOCUMENTS

| | | | | |
|---|---|---|---|---|
| 4,432,135 | A | * | 2/1984 | Greenlee ................ H02K 3/527 29/598 |
| 4,547,690 | A | * | 10/1985 | Bath ...................... H02K 3/487 310/214 |
| 4,603,273 | A | * | 7/1986 | McDonald ............... H02K 5/15 310/216.132 |
| 4,633,574 | A | | 1/1987 | Bath et al. |
| 5,090,114 | A | * | 2/1992 | Walker ..................... H02K 3/16 29/268 |
| 5,117,553 | A | | 6/1992 | Kliman |
| 5,430,340 | A | * | 7/1995 | Shih ........................ H02K 3/16 310/214 |
| 6,548,928 | B2 | | 4/2003 | Walko et al. |
| 7,788,790 | B2 | | 9/2010 | Neet |
| 2007/0241629 | A1 | * | 10/2007 | Ionel ..................... H02K 1/141 310/214 |
| 2016/0164350 | A1 | | 6/2016 | Matsunaga et al. |

FOREIGN PATENT DOCUMENTS

| | | | |
|---|---|---|---|
| JP | 2001045691 | * | 2/2001 |
| JP | 2016076321 A1 | | 5/2016 |

* cited by examiner

ELECTRICAL MACHINE LAMINATIONS

BACKGROUND

1. Field

The present disclosure relates to electrical machines, more specifically to laminations and stacks formed therefrom.

2. Description of Related Art

Certain electrical machines (e.g., motors and generators) include laminations stacked to form the core. There are multiple methods to stack laminations for a motor/generator core (bond, interlock, welding, or cleating/clenching). The process of cleating/clenching is a very simple and cost effective method to put a stack together. The process, however, requires mechanical space on the outer diameter in order to place a cleat to hold the stack together. The issue with this is that the back iron needs to be increased which leads to weight and volume increases. Another effect of the outer diameter cleat is that the outer diameter is non-uniform leading to additional stress on the outer diameter due to press fits for aerospace applications.

Such conventional methods and systems have generally been considered satisfactory for their intended purpose. However, there is still a need in the art for improved laminations for lamination stacks. The present disclosure provides a solution for this need.

SUMMARY

A lamination for an electrical machine lamination stack includes a body defining a plurality of winding slots on an inner diameter thereof and at least one inner diameter cleat aperture defined by the body configured to receive a cleat in an unlocked position and to interfere with the cleat when the cleat is transitioned to a locked position within the inner diameter cleat aperture such that a plurality of laminations can be stacked and locked together by the cleat.

The cleat aperture can be formed at a radially outward portion of the one or more winding slots. In certain embodiments, the cleat aperture can be wider in a circumferential direction than any other portion of the one or more winding slots.

The cleat aperture can include two corners forming an angle of 90 degrees or less configured to prevent radial movement of the cleat relative to the body, for example. Any other suitable shape is contemplated herein.

In certain embodiments, the lamination can include at least two cleat apertures. The lamination can include three cleat apertures. The three cleat apertures can be located 120 degrees circumferentially from each other, for example. In certain embodiments, the lamination can include a aperture in each winding slot.

In accordance with at least one aspect of this disclosure, an electrical machine core can include a plurality of laminations as described herein stacked together. The core can include a cleat disposed in the at least one aperture in a locked position such that the plurality of laminations are locked together.

The aforementioned description of the systems and methods apply to a stator lamination for example, however, they are applicable to a rotor lamination as well.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
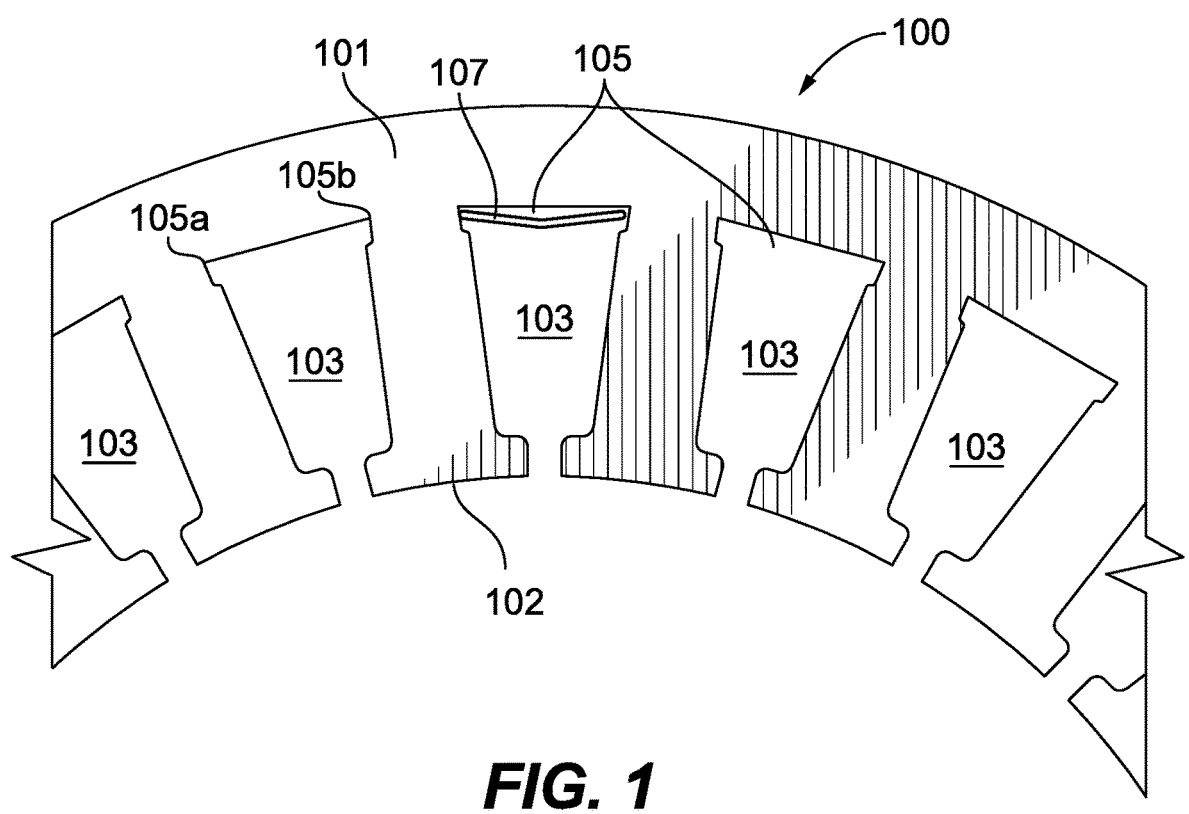
FIG. 1 is a schematic partial view of an embodiment of a lamination in accordance with this disclosure, showing a cleat disposed in an inner diameter thereof in an unlocked position.
Figure 2:
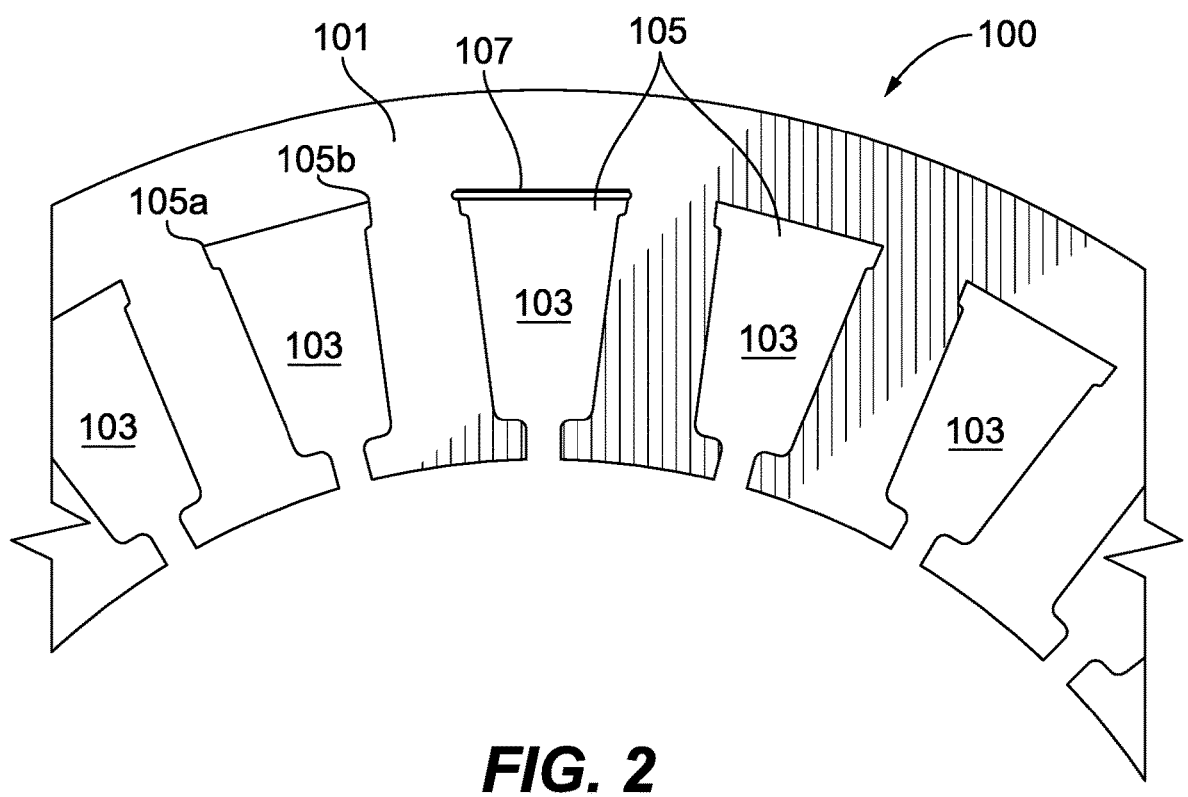
FIG. 2 is a schematic partial view of embodiment of FIG. 1, showing a cleat disposed in an inner diameter thereof in a locked position.
Figure 3:
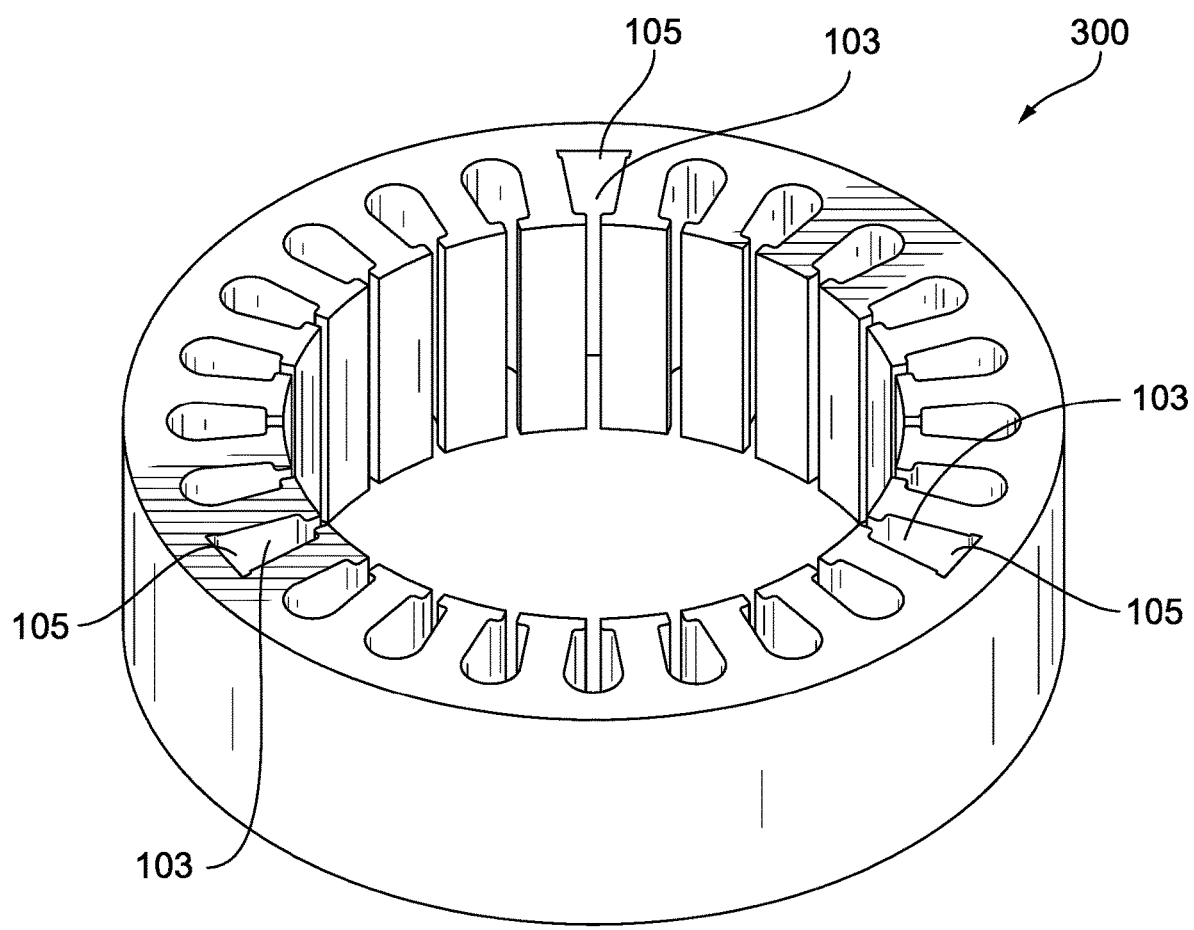
FIG. 3 is a perspective view of an embodiment of a lamination stack in accordance with this disclosure.

Reference will now be made to the drawings wherein like reference numerals identify similar structural features or aspects of the subject disclosure. For purposes of explanation and illustration, and not limitation, an illustrative view of an embodiment of a lamination in accordance with the disclosure is shown in FIG. 1 and is designated generally by reference character 100. Other embodiments and/or aspects of this disclosure are shown in FIGS. 2 and 3. The systems and methods described herein can be used to reduce the size, weight, and complexity of electrical machine cores.

Referring to FIG. 1, a lamination 100 for an electrical machine lamination stack includes a body 101 defining a plurality of winding slots 103 that extend radially outward of an inner diameter 102 of the body 101. The lamination includes at least one cleat aperture 105 defined by the body 101 configured to receive a cleat 107 in an unlocked position (e.g., as shown in FIG. 1). Referring additionally to FIG. 2, the cleat aperture 105 is configured to interfere with the cleat 107 in a locked position such that a plurality of laminations 100 can be stacked and locked together by the cleat 107.

As shown, the cleat aperture 105 can be formed within one or more of the winding slots 103, for example. However, it is contemplated that the cleat aperture 105 can be defined by the body in any other suitable portion of the body 101 as long as the cleat aperture is not open to the outer diameter of the body 101.

The cleat aperture 105 can be formed at a radially outward portion of the one or more winding slots 103, for example. In certain embodiments, the cleat aperture 105 can be wider in a circumferential direction than any other portion of the one or more winding slots 103 as shown. Any suitable location in the one or more winding slots 103 and/or any relative size, shape, or dimension to the one or more winding slots 103 is contemplated herein.

The cleat aperture 105 can include two corners 105*a*, 105*b* forming an angle of 90 degrees or less that are configured to prevent radial movement of the cleat relative to the body, e.g., such that the cleat cannot slip radially, for example. Any other suitable feature and/or shape of the aperture 105 is contemplated herein such that it interferes with the cleat 107 in the locked position of the cleat 107.

Any suitable number of apertures 105 on a lamination 100 is contemplated herein. For example, as shown in FIGS. 1 and 2, the lamination 100 can include a aperture in each winding slot 103. In certain embodiments, the lamination 100 can include at least two cleat apertures 105. For example, the lamination 100 can include three cleat apertures 105 (e.g., as shown in FIG. 3). In certain embodiments, the three cleat apertures can be located 120 degrees circumferentially from each other, for example.

As appreciated by those having ordinary skill in the art in view of this disclosure, the laminated 100 can be formed in any suitable manner. For example, the winding slots 103 and/or the one or more cleat apertures 105 can be stamped from sheet metal.

Referring additionally to FIG. 3, an embodiment of an electrical machine core 300 can include a plurality of laminations (e.g., laminations 100) as described above stacked together. As shown, the electrical machine core 300 can include three apertures 105 positioned about 120 degrees apart.

The core 300 can include a cleat 107 disposed in the at least one aperture 105 in a locked position such that the plurality of laminations are locked together. As appreciated by those skilled in the art, the cleat 107 can be longer in dimension in the locked position (e.g., as shown in FIG. 2) then the aperture 105 is wide to create an interference fit. Accordingly, the cleat 107 can be changed (e.g., by pressing down on the peak of the cleat 107 as shown) from the unlocked position as shown in FIG. 1 to a more flattened locked position as shown in FIG. 2. As a result, the cleat 107 can be compressed against the walls that define the aperture 105 to provide a tight fit. The cleat 107 can be made of any suitable material (e.g. steel, non-magnetic material such as high Ni alloy).

As appreciated by those having ordinary skill in the art in view of this disclosure, the laminations 100 can be formed followed by stacking of the laminates 100 to form a core. The cleats 107 can then be inserted into the apertures 105 in an unlocked position (e.g., as a v-shaped channel of material that is at least as long as the core is stacked high). Then the cleat 107 can be deformed to the locked position to interfere with the walls of the apertures 105 to lock all the laminations 100 in place to form the core. In certain embodiments, insulation (not shown) can be added after adding the cleats 107 which will cover each cleat 107. Then the windings (not shown) can be added to the winding slots 103 (e.g., either by sliding premade winding in the slots 103 or by sewing through windings).

Embodiments allow for a small core to be clenched without major impact to the design. Also, embodiments allow the outer diameter of the core to remain uniform and smooth which can allow for a better fit in assemblies and more effective heat transfer (e.g., if a back iron cooling scheme is utilized). Also, existing cores can be converted without major impact to performance. The aforementioned description of the systems and methods apply to a stator lamination, however, they are applicable to a rotor lamination as well.

The methods and systems of the present disclosure, as described above and shown in the drawings, provide for laminations and cores with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A lamination for an electrical machine lamination stack, comprising:
a body defining a plurality of winding slots on an inner diameter thereof; and
at least one inner diameter cleat aperture defined by the body configured to receive a cleat in an unlocked position wherein the cleat is curved or angled and to interfere with the cleat when the cleat is transitioned to a locked position within the inner diameter cleat aperture wherein the cleat is flatter than in the unlocked position such that a plurality of laminations can be stacked and locked together by the cleat, wherein the cleat aperture is formed within the winding slot, wherein the cleat aperture is not open to the outer diameter of the body, wherein the cleat aperture is formed at a radially outward portion of the one or more winding slots.

2. The lamination of claim 1, wherein the cleat aperture is formed within one or more of the winding slots.

3. The lamination of claim 2, wherein the cleat aperture is wider in a circumferential direction than any other portion of the one or more winding slots.

4. The lamination of claim 1, wherein the cleat aperture includes two corners forming an angle of 90 degrees or less configured to prevent radial movement of the cleat relative to the body.

5. The lamination of claim 1, wherein the at least one cleat aperture includes at least two cleat apertures.

6. The lamination of claim 1, wherein the at least one cleat aperture includes three cleat apertures.

7. The lamination of claim 6, wherein the three cleat apertures are located 120 degrees circumferentially from each other.

8. The lamination of claim 1, wherein the at least one aperture includes a single aperture in each winding slot.

9. An electrical machine core, comprising:
a plurality of laminations stacked together, each lamination including:
a body defining a plurality of winding slots on an inner diameter thereof; and
at least one inner diameter cleat aperture defined by the body configured to receive a cleat in an unlocked position wherein the cleat is curved or angled and to interfere with the cleat in a locked position wherein the cleat is flatter than in the unlocked position such that a plurality of laminations can be stacked and locked together by the cleat, wherein the cleat aperture is formed within the winding slot, wherein the cleat aperture is not open to the outer diameter of the body, wherein the cleat aperture is formed at a radially outward portion of the one or more winding slots.

10. The core of claim 9, wherein the cleat aperture is formed within one or more of the winding slots.

11. The core of claim 10, wherein the cleat aperture is wider in a circumferential direction than any other portion of the one or more winding slots.

12. The core of claim 9, wherein the cleat aperture includes two corners forming an angle of 90 degrees or less that are configured to prevent radial movement of the cleat relative to the body.

13. The core of claim 9, wherein the at least one cleat aperture includes at least two cleat apertures.

14. The core of claim 9, wherein the at least one cleat aperture includes three cleat apertures.

15. The core of claim 14, wherein the three cleat apertures can be located 120 degrees circumferentially from each other.

16. The core of claim 9, wherein the at least one aperture includes a aperture in each winding slot.

17. The core of claim 9, further comprising a cleat disposed in the at least one aperture in a locked position such that the plurality of laminations are locked together.

* * * * *